United States Patent [19]

Hsu et al.

[11] Patent Number: 4,875,969

[45] Date of Patent: Oct. 24, 1989

[54] METHOD OF MAKING A FIBER OPTIC ARRAY

[75] Inventors: Kevin Hsu, Atlanta, Ga.; Srinivas T. Rao, Los Gatos, Calif.; Joseph Y. Kaukeinen, Rochester, N.Y.

[73] Assignee: Eastman Kodak Company, Rochester, N.Y.

[21] Appl. No.: 254,756

[22] Filed: Oct. 7, 1988

[51] Int. Cl.[4] .................. H01L 21/306; B44C 1/22; C03C 15/00; C03C 25/06

[52] U.S. Cl. .................................. 156/633; 65/31; 156/645; 156/654; 156/655; 156/659.1; 156/662; 156/663

[58] Field of Search ............... 156/629, 633, 645, 647, 156/654, 650, 655, 659.1, 662, 663; 65/4.2, 4.21, 4.3, 31; 355/1; 350/96.15, 96.2, 96.21, 96.24, 96.29, 96.3

[56] References Cited

U.S. PATENT DOCUMENTS

| | | | |
|---|---|---|---|
| 4,165,225 | 8/1979 | Auracher et al. | 65/31 X |
| 4,364,064 | 12/1982 | Baues | 346/107 R |
| 4,389,655 | 6/1983 | Baues | 346/107 R |
| 4,495,412 | 1/1985 | Thoone et al. | 250/227 |
| 4,556,279 | 12/1985 | Shaw et al. | 350/96.15 |
| 4,590,492 | 5/1986 | Meier | 346/107 R |
| 4,612,028 | 9/1986 | Abebe et al. | 65/4.2 |
| 4,723,830 | 2/1988 | Messbauer | 350/96.20 |

Primary Examiner—William A. Powell
Attorney, Agent, or Firm—Donald D. Schaper

[57] ABSTRACT

A method is disclosed for making a fiber optic array for use in an optical scanning device. The array includes a substrate and a plurality of optical fibers arranged on the substrate to form a linear array of the fibers. Each of the fibers is received in grooves in the substrate to precisely space the fibers relative to each other. Each of the fibers is adapted to receive light from a source such as a laser diode. In order to increase the packing density of the fibers in the array, the fibers are mounted in sets of parallel grooves which are spaced to draw the fibers closer together at an output end. Further, the ends of the fibers are etched to decrease the cladding diameter and thereby permit the fiber ends to be more closely spaced relative to each other.

7 Claims, 3 Drawing Sheets

METHOD OF MAKING A FIBER OPTIC ARRAY

CROSS REFERENCE TO RELATED APPLICATIONS

Reference is made to commonly-assigned U.S. patent applications, Ser. No. 254,758, entitled Method of Making A Fiber Optic Array, filed in the name of Kaukeinen et al. on even date herewith, Ser. No. 254,759, entitled Fiber Optic Array, filed in the names of Hsu, Owens, and Sarraf, on even date herewith, and Ser. No. 254,757, entitled Fiber Optic Array, filed on in the name of Kaukeinen on even date herewith.

BACKGROUND OF THE INVENTION

1. Field of the Invention

The present invention relates to a method of making a fiber optic array, and more particularly, to a method of making an array which has an increased packing density.

2. State of the Prior Art

It is known in the prior art to use an array of optical fibers in a print head which is used to record information on a light-sensitive recording medium. The fibers can be arranged with their output ends in a linear array extending in a direction transverse to the direction of movement of the recording medium, and a light source, such as a light-emitting diode or a diode laser, can be connected to each of the fibers at an input end. The light in each of the fibers is modulated in accordance with an information signal to produce a desired image. Focusing means can be used in front of each fiber to cause the light to be focused to a point on the recording medium. It is desirable for the arrays of optical fibers to have a high packing density, i.e., a high number of fibers per unit width of the array, in order to limit the amount of data buffering needed to produce the output image. There is a problem, however, in using increasingly thinner fibers to increase the packing density. As the fibers are made thinner, handling and alignment of the fibers becomes more difficult, and the thinner fibers are more likely to break in the assembly process.

In U.S. Pat. No. 4,389,655, there is shown an optical device for non-impact recording in which the recording head includes a linear array of optical fibers. The recording head comprises an adjustment plate having a plurality of grooves therein, and an optical fiber is secured in each of the grooves. In one embodiment of the invention, the fibers have been arranged in grooves which converge toward the output end of the array to closely space the output ends of the fibers. In another embodiment, one row of fibers is arranged above another row, and the fibers in the top row are offset relative to the fibers in the bottom row. In both of these embodiments, however, the packing density of the fibers is limited by the relatively large diameter of the fibers at their output ends.

SUMMARY OF THE INVENTION

It is an object of the present invention to overcome the problems in the prior art noted above and to provide an improved method of making a fiber optic array for use in scanning devices.

In accordance with one aspect of the invention, there is provided a method of making a fiber optic array comprising the steps of: forming a plurality of grooves in a substrate, the grooves extending to a first end of the substrate; removing a portion of cladding from one end of a plurality of optical fibers to form fibers in which the one end has cladding of a reduced outside dimension relative to the outside dimension of the cladding at an opposite end of the fibers; placing the fibers in the grooves such that all of the fibers extend in generally the same direction, the ends of the fibers having the reduced dimension being placed in grooves adjacent the first end of said substrate; and cementing the fibers in the grooves.

In one embodiment of the present invention, closely spaced V-shaped grooves, which are adapted to receive the cladding of the fibers, are etched in a silicon substrate. Grooves, which are adapted to receive jackets of the fibers and are generally rectangular in cross section, are formed at one end of the substrate. Jackets of the optical fibers are removed from a certain length of the fibers, and the ends of the fibers are etched to reduce the diameter of the end portion. The optical fibers are then inserted in each of the grooves to form a linear array of fibers. An adhesive is used to secure the fibers in the grooves.

A principal advantage of the present invention is that a very high packing density of the fibers is obtained as a result of using fibers in which the cladding diameter at one end has been substantially reduced by etching. Although the array has a high packing density, there is no coupling of light between adjacent fibers. Since only an end portion of the fiber is etched, the strength and rigidity of the fiber is retained, and the fibers can be assembled in the array according to the method of the present invention without breakage. Outputs from the closely-spaced and independently-addressable fibers can be imaged onto a receiving medium through a single train of optics with diffraction-limited performance.

Other features and advantages will become apparent with reference to the following Description of the Preferred Embodiments when read in light of the attached drawings.

DESCRIPTION OF THE PREFERRED EMBODIMENT

Figure 1:
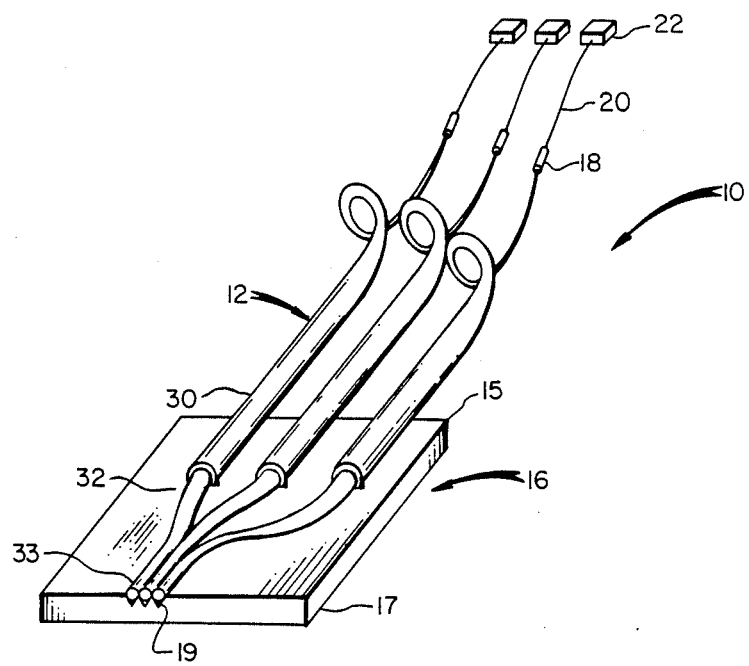
FIG. 1 is a perspective view of a fiber optic array which has been made in accordance with the method of the present invention.

With reference to FIG. 1, there is shown a fiber optic array 10 constructed in accordance with the present invention. Fiber optic array 10 comprises three optical fibers 12 which are supported on a substrate 16. Each of the fibers 12 is connected by means of an optical fiber connector 18 to another optical fiber 20. Optical fiber connector 18 can be of the type shown in commonly-assigned U.S. Pat. No. 4,723,830, entitled Optical Fiber Connectors, issued Feb. 9, 1988. Each optical fiber 20 is connected to a light source 22, such as a diode laser or a light-emitting diode. Each light source 22 in array 10 can be modulated according to an information signal in a well-known manner. Array 10 can be used to record information on a light-sensitive medium (not shown) such as a photoconductor or photographic film. Array 10 can also be used as an optical scanner (not shown) in which light reflected from an object is transmitted through the optical fibers to photosensitive elements.

Figure 4:
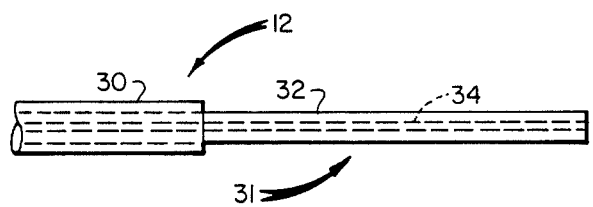
FIG. 4 is a view of a fiber which has been prepared for etching.
Figure 5:
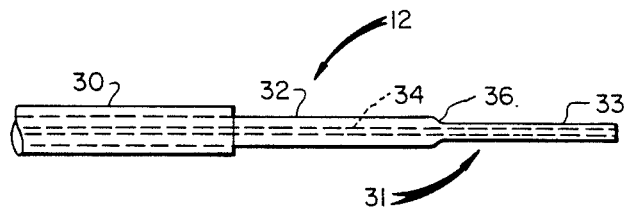
FIG. 5 is a view of a fiber after etching.

As shown in FIGS. 4 and 5, each of the optical fibers 12 includes a jacket 30, a cladding 32, and a core 34. Jacket 30 has been removed from an end 31 of the fiber 12 to expose the cladding 32, and in a cladding portion 33 (FIG. 5), the diameter of the cladding is substantially reduced so that the portions 33 can be more closely spaced relative to each other. A tapered cladding portion 36 is formed at one end of portion 33. A fiber suitable for use in the present invention is a special single-mode fiber made by Corning Glass Works, Fiber No. 56704121,KH1. This fiber is made of silica with germanium doping in the core 34. The jacket 30 has a diameter of 250 $\mu$m, the cladding 32 has a diameter of 125 $\mu$m, and the core 34 has a diameter of 4 $\mu$m. Other optical fibers can be used with the present invention, including multi-mode fibers.

Figure 3:
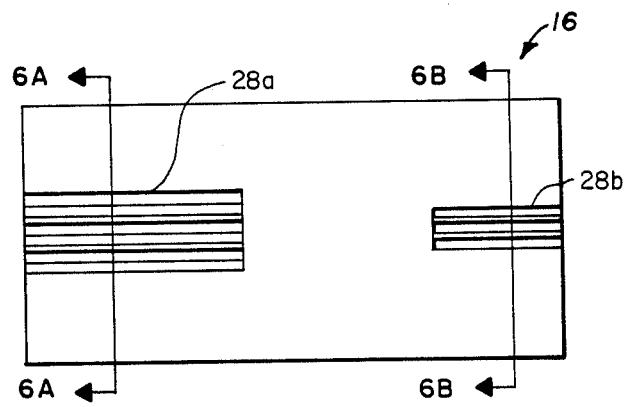
FIG. 3 is a plan view of another substrate which has been made according to the present invention.

As shown in FIG. 1, fibers 12 extend from an end 15 of array 10 which supports jackets 30 of the fibers to an opposite end 17 of the array, and the fibers 12 are closest together at the end 17. Fibers 12 are mounted in sets of grooves 28a and 28b which are formed in substrate 16, as shown in FIG. 3. The sets of grooves 28a and 28b are generally aligned, and the grooves in each set are generally parallel.

Figure 2:
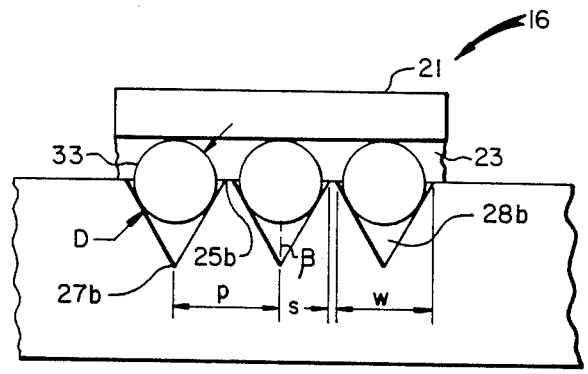
FIG. 2 is an enlarged elevational view of one end of the array showing the spacing of the grooves and the location of an optical fiber in a groove.

As shown in FIG. 2, a glass plate 21 extends over the fibers 12 in grooves 28b, and a similar plate (not shown) extends over the jackets 30 of fibers 12 in grooves 28b. These glass plates are very essential in the fabrication of array 10 as will be explained hereinafter. The glass plates 21 have been omitted in FIG. 1 in order to more clearly show elements of the present invention. As shown in FIG. 2, an epoxy 23, which secures the fibers 12 in the grooves, fills the void areas between the plate 21, the substrate 16, and the fibers 12.

Figure 6A:
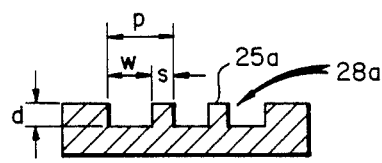
FIGS. 6A and 6B are sectional views taken on lines 6A—6A and 6B—6B, respectively, in FIG. 3.
Figure 6B:
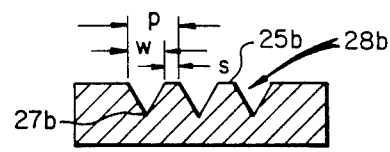

Grooves 28a are sized to receive the jackets 30 of fibers 12. Grooves 28b are adapted to receive the cladding portions 33 of reduced diameter. As shown in FIGS. 6A and 6B, the pitch p of the grooves 28a and 28b includes the width W of the grooves and the width S of lands 25a and 25b. The dimensions of the grooves 28a and 28b will depend on the size and type of fiber used in array 10. For example, for a single mode fiber of the type described above which is obtainable from Corning Glass Works, the pitch p of grooves 28a can be about 275 $\mu$m, the pitch p of grooves 28b can be about 20 $\mu$m, the width S of the land 25a can be about 25 $\mu$m, and the width S of land 25b can be about 4 $\mu$m.

With reference to FIG. 2, end 17 of array 16 is shown with portions 33 of a fibers 12 in grooves 28b. The dimensions of grooves 28b and portions 33 of fibers 12 are indicated in FIG. 2 where W is the maximum width of a groove 28b, $\beta$ is the half angle of a groove 28f, S is the width of the land 25b, and P is the channel separation, that is the distance between the grooves 28b at bottoms 27b thereof. D is the diameter of cladding portion 33 of a fiber 12. The dimensions W, S, and P for various diameters D of portions 33 are shown in Table I. The angle $\beta$ is about 35° for grooves etched in silicon; however, grooves of different angles can be used.

TABLE I

| D ($\mu$m) | W ($\mu$m) | S ($\mu$m) | P ($\mu$m) |
|---|---|---|---|
| 10 | 12 | 4 | 16 |
| 20 | 24 | 4 | 28 |
| 30 | 36 | 4 | 40 |
| 40 | 49 | 4 | 53 |
| 50 | 61 | 4 | 65 |
| 100 | 146 | 4 | 150 |

Figure 8:
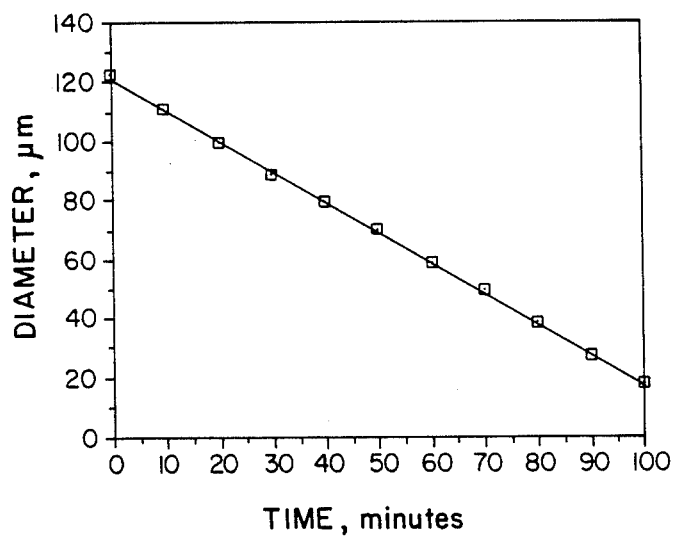
FIG. 8 is a graph showing the etching characteristic of an optical fiber.

In FIG. 4, there is shown a fiber 12 in which the jacket 30 has been removed from a portion thereof in preparation for an etching step. Fiber 12 is etched in hydrofluoric acid (HF) in order to reduce the diameter of cladding 32 from 125 $\mu$m to a diameter as small as 10 $\mu$m. In FIG. 8, a plot of the etching characteristic is shown for room temperature. The nominal etching rate is 1.00 $\mu$m/min. The diameter of portion 33 must be large enough so there is no coupling of light between adjacent fibers. For best results, the diameter of the cladding in portion 33 should be at least 10 $\mu$m.

A fiber 12, after etching, is shown in FIG. 5. During the etching process, the ends of fibers 12 are placed in the hydrofluoric acid, and the tapered portion 36 is formed above the surface of the HF acid as a result of capillary action. It has been found that the tapered portion 36 has a beneficial effect in that the bending strength of the fiber 12 is substantially greater than it would be if there were a sharp change from cladding 32 to the cladding portion 33 of reduced diameter. The core 34 of fiber 12 is etched faster than the cladding 34; as a result, a concave tip (not shown) is formed on core 34 which must be removed by polishing at a later stage in the process.

The substrate 16 is preferably formed from a silicon wafer (not shown) by photolithographic means. A suitable mask (not shown) is used to form the grooves 28b for a plurality of substrates 16 on the wafer. The wafer is cleaned before and after etching using acetone and deionized water, and the wafer is then blown dry with nitrogen. The etching agent is a 12% potassium hydroxide (KOH) solution with a bath temperature of approximately 62° C. This results in an etching rate in groove depth of approximately 0.29 $\mu$m/min. Grooves 28a at end 15 of the substrate are formed last, and they are formed with a diamond-impregnated saw blade. Grooves 28a are adapted to receive the jackets 30 of the fibers 12. In one illustrative example, the grooves 28a, as shown in FIG. 6A, are generally rectangular in cross section, and the width W is about 275 $\mu$m, the depth d is between about 60 and about 150 $\mu$m, and the width S of the lands 25a is about 25 $\mu$m.

In the assembly of the fiber optic array, the jackets 30 of fibers 12 are first cemented in grooves 28a at end 15 of the array 10. In a first step, the jackets 30 of fibers 12 are aligned in a holder (not shown), and the aligned fibers are then placed in grooves 28a on substrate 16. A glass plate, e.g. a plate 21 as shown in FIG. 2, is placed over the jackets 30 in the grooves 28a. The glass plate can be about 150 $\mu$m thick and should be of a size to extend over the grooves 28a. The glass plate is held in place by a micropositioner, for example, a Model 221 micropositioner, obtainable from Rucker and Kolls. An ultraviolet light curable epoxy is introduced between the glass plate and substrate 16, and the epoxy is drawn into grooves 28a around the jackets 30 of fibers 12 by means of capillary action. The epoxy is cured by ultraviolet light. The portions 33 of fibers 12 are then eased into grooves 28b, and the portions 33 are cemented in place by means of a glass plate and a UV curable epoxy as described for jackets 30. That is, the glass plate is placed directly over the portions 33 and grooves 28b, the plate is held in position by a micropositioner, and UV curable epoxy is introduced around the fibers 12 in the grooves by means of capillary action. When the fibers 12 are fixed in place, a portion of the array facet 19 is removed by means of a dicing saw, and in a final step, the facet is polished.

An important element of the present invention is the adhesive used to cement the fibers to the substrate. The adhesive must have low viscosity for good capillary action and a lower refractive index than that of the cladding to minimize radiation loss and cross talk between fibers. After the adhesive has cured, there should be low stress on the fiber to minimize micro-bending loss, and the adhesive should have adequate hardness to insure a polished surface of high quality. One suitable adhesive is Norland 61 adhesive which can be obtained from the Norland Co. However, a preferred adhesive is Lamdek U V Adhesive, Catalog No. 177 6921, obtainable from Dymax Engineering Adhesives, a division of American Chemical and Engineering Co., Torrington, CT.

In an illustrative example of the present invention, an array 10 was formed from single mode fibers having a core diameter of about 4 μm and a cladding diameter of about 125 μm. The portions 33 were etched to a diameter of about 15 μm, the length of portions 33 was about 25 mm after dicing and polishing, and the channel separation (P) between grooves 28b on substrate 16 was about 28 μm. The fibers 12 were mounted on a substrate 16 as shown in FIG. 1. The array thus formed was evaluated for taper/packaging loss, cross-talk level, and the output-beam quality. The taper/packaging loss is an indication of the radiation loss due to fiber taper, to the etched cladding, and to packaging stress in comparison to the radiation loss due to these factors from a free and normal single mode fiber. It was found that the propagation characteristics of the optical field were changed very little due to the etching and packaging in forming the array of the present invention, and thus, a substantial increase in packing density has been achieved in the array with practically no loss in the efficiency of the fibers.

Figures 7A, 7B, 7C:
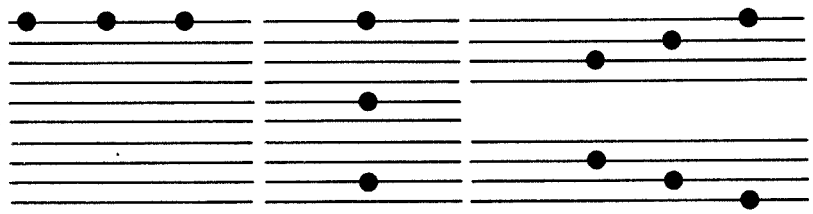
FIGS. 7A–7C are schematic diagrams showing various print formats which can be achieved with the array of the present invention.

It will be apparent that the number and spacing of fibers 12 can be changed to meet the needs of a particular application. An array (not shown) could extend the full length of a recording medium, or a recording head (not shown) could include a plurality of arrays arranged side-by-side or in parallel rows. An array 10 can also be used to produce various print formats, as shown in FIG. 7a-7c. In FIG. 7a, the fibers 12 of array 10 are arranged to produce three spots in the line scan direction, each spot being separated by several pixels. In FIG. 7b, the spots are aligned in the page scan direction, with each pixel separated by several lines, and in FIG. 7c, the spots are diagonally aligned and separated by variable spacings. Since the spots in FIG. 7a are separated by several pixels, an output device would include data buffering means in the information processing electronics, as is well-known in the art. The arrangement in FIG. 7a could be used, for example, in a color-recording device in which each of the spots represents one of the primary colors. A method of interleaving scan lines from an array of the type shown in FIG. 7b is disclosed in a commonly-assigned patent application entitled Method of Scanning, U.S. Ser. No. 254,745, filed in the name of D. Hass on even date herewith.

The invention has been described in detail with particular reference to a preferred embodiment thereof, but it will be understood that variations and modifications can be effected within the spirit and scope of the invention.

We claim:

1. A method of making a fiber optic array comprising the steps of:
    forming a plurality of grooves in a substrate, said grooves extending to a first end of the substrate;
    removing a portion of cladding from one end of a plurality of optical fibers to form fibers in which said one end has cladding of a reduced outside dimension relative to the outside dimension of the cladding at an opposite end of the fibers;
    placing said fibers in said grooves such that all of the fibers extend in generally the same direction, the ends of the fibers having the reduced dimension being placed in grooves adjacent said first end of said substrate; and
    cementing the fibers in the grooves.

2. A method of making a fiber optic array, as defined in claim 1, wherein said cladding is removed by etching said fiber in hydrofluoric acid.

3. A method of making a fiber optic array, as defined in claim 2, wherein the ends of said fibers are dipped in the acid during the etching process, and a portion of the fiber above the acid is exposed to the acid by capillary action to form a tapered portion of cladding between said ends of the fiber.

4. A method of making a fiber optic array, as defined in claim 1, wherein said grooves are formed in sets, and the grooves in each of said sets have a different pitch.

5. A method of making a fiber optic array, as defined in claim 4, wherein the grooves in some of said sets are formed by photolithographic techniques.

6. A method of making a fiber optic array, as defined in claim 5, wherein the grooves in one of said sets are formed by a diamond blade.

7. A method of making a fiber optic array comprising the steps of:
    etching a least one set of grooves in a substrate, said grooves being generally aligned and extending from to one end of the substrate;
    forming another set of grooves in said substrate at an opposite end thereof;
    removing a portion of cladding from a first end of a plurality of optical fibers to form fibers in which said first end has cladding of a reduced outside dimension relative to an outside dimension of the cladding at a second end of the fibers;
    placing jackets of said optical fibers in said other set of grooves and cementing the jackets therein;
    placing said first ends of the fibers in the grooves of said one set of grooves; and
    cementing said first ends in the grooves.

* * * * *